United States Patent [19]

Balke et al.

[11] Patent Number: 5,144,739
[45] Date of Patent: Sep. 8, 1992

[54] METHOD OF ESTABLISHING A LEAKAGE CURRENT PATH FOR A COMMUTATOR

[75] Inventors: Roy L. Balke; Joseph E. Jack, both of Erie, Pa.

[73] Assignee: General Electric Company, Fort Wayne, Ind.

[21] Appl. No.: 721,047

[22] Filed: Jun. 26, 1991

[51] Int. Cl.⁵ .............................................. H01R 43/00
[52] U.S. Cl. ..................................... 29/597; 156/162; 156/188; 156/292; 310/236
[58] Field of Search ................. 29/597, 598; 310/234, 310/235, 236; 156/160–163, 187, 188, 190, 290, 290

[56] References Cited

U.S. PATENT DOCUMENTS

| | | | |
|---|---|---|---|
| 3,129,350 | 4/1964 | Clark | 310/235 |
| 3,146,364 | 8/1964 | Paul | 310/236 |
| 3,486,057 | 12/1969 | Stude et al. | 310/235 |
| 3,532,913 | 10/1970 | Forste et al. | 310/234 |
| 3,697,792 | 10/1972 | Roue | 310/234 |
| 3,751,700 | 8/1973 | Cole | 310/235 |
| 3,996,660 | 12/1976 | Hancock | 29/597 |
| 4,170,505 | 10/1979 | Zgraggen | 156/162 |
| 4,341,972 | 7/1982 | Penn et al. | 310/233 |
| 4,422,234 | 12/1983 | Penn et al. | 29/597 |
| 4,638,202 | 1/1987 | Ebner | 310/235 |
| 4,710,662 | 12/1987 | Balke et al. | 310/204 |
| 4,890,377 | 1/1990 | Ebner | 29/597 |

OTHER PUBLICATIONS

"Improved Commutator Glass Band Protection" by M. A. Zgraggen, General Electric Company.
"General Electric MD 800 Armored Mill Motor" brochure.

Primary Examiner—Carl E. Hall
Attorney, Agent, or Firm—Ralph E. Krisher, Jr.

[57] ABSTRACT

Dynamoelectric machines characterized by lengthened ground potential leakage current paths, desirable mechanical conformations, mechanical integrity when subjected to expected centrifugal forces, and ease of manufacture. One process involves establishing an extended path for commutator leakage currents with a path extending structure, establishing a cantilevered insulation skirt about the in-board or armature coil end of a commutator, and securely fastening such skirt to the commutator. The material utilized in making the skirt is one: that has electrical properties that permit it to withstand leakage currents without tracking; that for practical purposes is non-burnable, so as to resist flashovers or sparking; and that has the ability to withstand elevated temperatures that are encountered within dynamoelectric machine. The skirt is provided with openings therein and sandwiched between two glass based bands that adhere to another through the openings and thus lock the skirt in place on the commutator body.

10 Claims, 3 Drawing Sheets

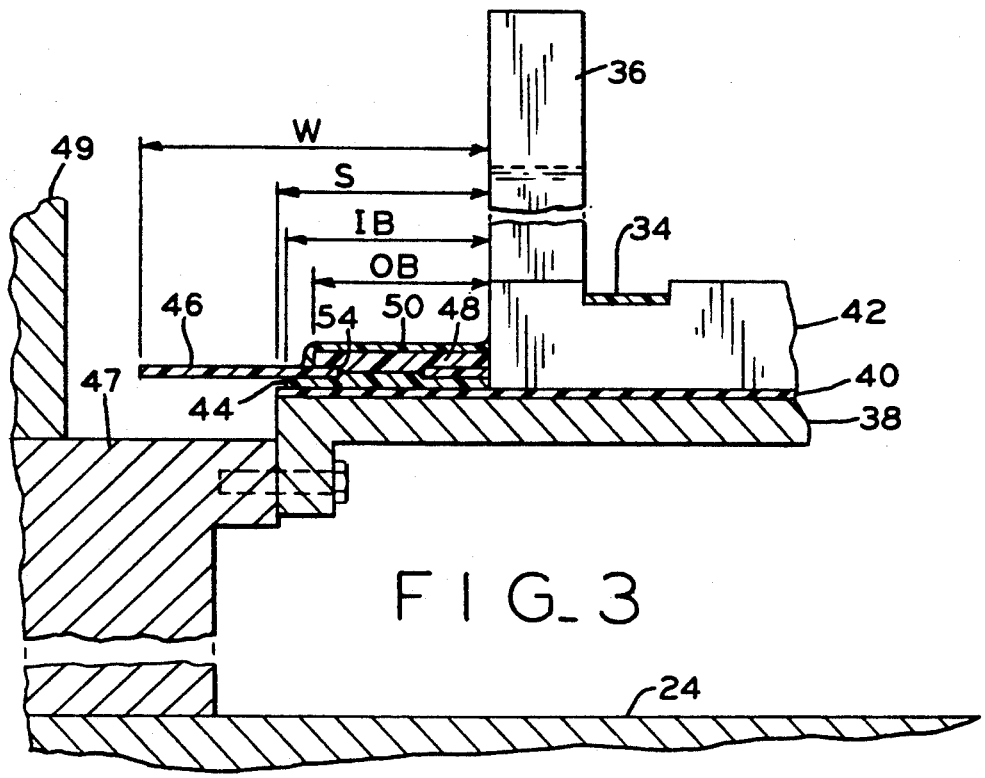
FIG_3
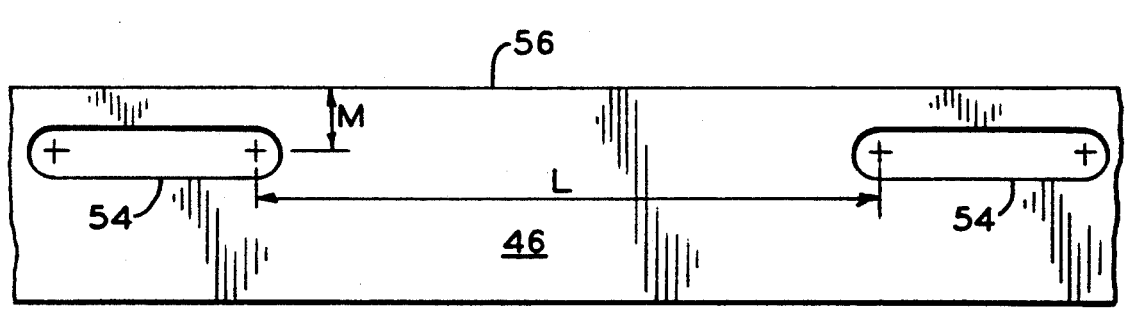
FIG_4

METHOD OF ESTABLISHING A LEAKAGE CURRENT PATH FOR A COMMUTATOR

The present invention relates generally to dynamoelectric machine technology and, more particularly, to technology associated with such machines and processes of manufacturing the same, which includes process and product features associated with commutators that feed current to an armature.

BACKGROUND OF THE INVENTION

In the manufacture of dynamoelectric machines such as DC motors and generators, it is well known that necessary components thereof consist of a stationary magnetic circuit structure (often referred to as the "field"); a magnetic circuit structure that rotates relative to the field (often referred to as an "armature"); a frame or housing structure that supports the dynamoelectric machine; one or more bearings that support the armature shaft relative to the field so that relative rotation therebetween may be achieved; and electrical switching means (e.g., a commutator assembly and brushes) for selectively making electrical connections with electrical conductors (often called "windings") in the machine.

Commutation is performed so that magnetic fields or poles associated with the armature and field have desired instantaneous predetermined spatial relationships such that the desired dynamoelectric effect is achieved (i.e., the conversion of mechanical energy to electrical energy in the case of a generator, or the conversion of electrical energy to mechanical energy in the case of a motor). As will be understood in the case of a motor, the forces of magnetic attraction and repulsion cause the armature to rotate relative to the field and deliver useful output torque or mechanical energy to the output shaft.

DC motors of both the permanent magnet and the wound coil type are generally described in numerous references works or publications. One such publication is the book entitled "Fractional And Subfractional Horsepower Electric Motors" by Cyril G. Veinott and Joseph E. Martin, 4th Edition, published by the McGraw-Hill Book Company bearing a copyright notice of 1986 and further idenified as ISBN 0-07-067393-4.

It will be understood by those skilled in the art that successful operation of a motor or generator is dependent upon continuous, normal performance of all of the components thereof that have been mentioned hereinabove. Thus, failure of a bearing, winding, or commutator all can have the same objectionable results, i.e., failure of the dynamoelectric machine to operate at worst, or degraded performance at best.

While the present invention (described in detail hereinbelow and claimed in the concluding portion of this specification) may be utilized in conjunction with either motors or generators, discussion from this point forward will be with reference only to motors or machines, and thus redundant reference to generators specifically or dynamoelectric machines generally will be avoided.

One of the modes of electrical failure associated with machines that utilize commutators has to do with insulation breakdown or failure, in the region of the in-board end of armature commutators. As will be understood, brushes which make electrical contact with commutators typically are formed of carbon and such brushes normally wear down during operation of the machine. This process results in degradation products (e.g., carbon dust) from such brush wear being present in increasingly large amounts during the life of a machine. Such dust is present within the interior of the machine and particularly within the vicinity of the commutator structure. Conductive materials such as carbon dust or powder, dirt, moisture, oil, and so forth result in electrical leakage paths and tracking currents that, with time, can build to sufficiently high levels to cause electrical failure of the machine.

It thus will be understood that it would be desirable to provide new and improved processes of manufacturing machines that utilize commutators, and to provide new and improved commutator and armature constructions that would better survive the accumulation of oil, water, moisture, and other contaminants.

It also would be desirable to provide such processes and products that could be reliably and economically manufactured; and that could contribute to increased life of the machine.

Accordingly, it is a general object of the present invention to provide new and improved methods of manufacturing dynamoelectric machines having improved insulating properties so that premature failure thereof, associated with electrical failure of a commutator, may be reduced, if not eliminated.

It is another object of the present invention to provide new and improved dynamoelectric machine designs having structural characteristics and component interrelationships that provide increased resistance to failure associated with commutator leakage currents.

It is a more specific object of the present invention to provide new and improved processes and product features of dynamoelectric machines such that commutator leakage currents do not lead to objectionable levels of deposits of tracking materials and tracking currents at levels sufficiently excessive to cause nuisance ground fault detection situations or premature electrical failure.

It is a more specific object to provide processes and product features for the general purpose described hereinabove, wherein improved insulation systems and processes providing the same result in structures that are fire resistant, so as to reduce the risk of burning interior machine components in event of flashover (i.e., violent arcing) from a commutator element to ground, or between positive and negative brushholders.

It is yet an even more specific object of the present invention to provide new and improved products and processes of making the same which will provide desirable insulating features and yet will also maintain sufficient mechanical and dimensional integrity to resist displacement and destruction of parts thereof due to centrifugal forces that are inherently associated with rotating masses.

SUMMARY OF THE INVENTION

In carrying out the above and other objects of the invention, we provide new and improved dynamoelectric machines and parts thereof, and manufacturing methods for use in conjunction with manufacturing new and improved dynamoelectric machines, subassemblies, and components thereof, characterized by lengthened ground potential leakage current paths, desirable mechanical conformations, mechanical integrity when subjected to expected centrifugal forces, and ease of manufacture.

In general, one process that involves the practice of the present invention includes manufacturing a commutator type dynamoelectric machine, and involves (inter-alia) the steps of establishing a predetermined desired extended or elongated path for commutator leakage currents with a path extending structure, insuring structural integrity of such path extending structure against undesirable deformation or damage due to expected centrifugal force induced stresses; and assembly of such commutator with other components of a machine in a manner so that power supplied to the machine may be preselectively supplied through the commutator to armature windings.

One specific preferred process involves the steps of providing an extended or elongated leakage current path by establishing a cantilevered insulation skirt about the in-board or armature coil end of a commutator, and securely fastening such skirt to the commutator.

A specific physical embodiment of the present invention, illustrated herein, includes a new and improved commutator type dynamoelectric machine wherein the commutator thereof is provided with a leakage current path establishing or extending structure in the form of a skirt made from an electrically insulative material having preselected desired electrical properties and characteristics. In a more preferred form, the material utilized in making the skirt is one: that has electrical properties that permit it to withstand leakage currents without tracking; that for practical purposes is non-burnable, so as to resist flashovers or sparking; and that has the ability to withstand elevated temperatures that are encountered within a dynamoelectric machine. Use of a selected material having desirable characteristics as just described presents a dilemma however, in that such material is not readily chemically bondable with materials normall used in the construction of electrical machines. Thus, new and novel approaches are followed to ensure the mechanical integrity of machines that include a skirt (as described above) made of the above-mentioned selected material.

An armature embodying the present invention and as illustrated herein includes conventional and previously known excitation conductors, an open riser segmented commutator, a mechanical support in the form of glass banding, and a new and novel electrically insulative material cantilever skirt.

The subject matter which we regard as our invention is set forth in the appended claims. The invention itself, however, together with further objects and advantages thereof may be better understood by referring t the following more detailed description taken in conjunction with the drawings, wherein like reference numbers are used to refer to like parts.

BRIEF DESCRIPTION OF THE DRAWINGS

FIG. 3 is a view, in cross-section, of a portion of the commutator illustrated in FIG. 2; clearly illustrating an electrically insulative material cantilevered skirt;

FIG. 4 is a view illustrating insulative material from which the cantilever skirt of FIG. 3 is formed.

DESCRIPTION OF PREFERRED EMBODIMENTS

Figure 1:
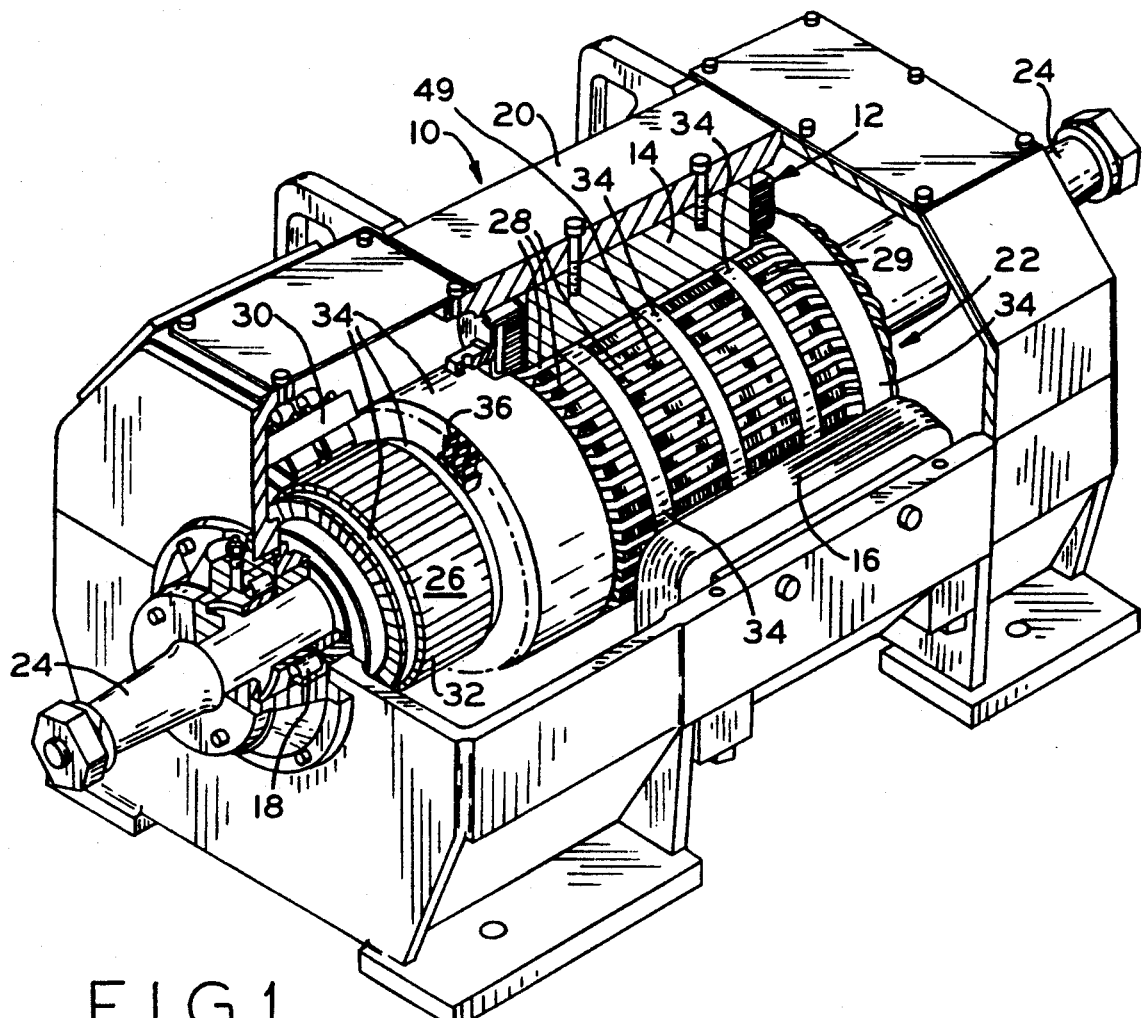
FIG. 1 is a perspective view, with parts removed and parts broken away, of a DC motor embodying the invention in one form thereof.

FIG. 1 illustrates a split frame DC motor, generally denoted by the reference numeral 10, that includes a field 12 comprised of a plurality of not shown field pole pieces and windings, and commutating or interpole pieces 14 about each of which are disposed windings in the form of coils 16. A bearing 18 is carried in the end frame or shield 19 that closes each end of the housing 20. Also forming part of the motor is the armature which, as will be understood, includes an armature shaft 24, commutator 26, and armature windings or conductors 28 that are carried on the armature magnetic core 29. In addition, a brush mechanism is provided in the machine 10 that includes a plurality of brush holders 30, each of which carry one or more carbon brushes that make contact with the commutating surface 32 of the commutator 26. The commutating surface 42 is made up of a plurality of spaced apart conductors that include conductive elements electrically interconnected with armature conductors, and such spaced apart conductors are separated and spaced from one another by dielectric material such as mica (all as is well known in the art).

The conductive portions of commutators are typically made of copper, and commutators are shown in significant detail in a number of prior patents. For example, U.S. Pat. No. 4,710,662 to Balke et al. discloses an armature, including a commutator; and U.S. Pat. No. 4,890,377 to Ebner illustrates other details involving commutators; as do U.S. Pat. Nos. 3,996,660 (Hancock) and 3,486,057 (Stude et al.). Since these patents show and describe details of commutators to which features of our invention could be applied, and also describe construction details known in the art, the entire disclosures of each of the just referenced United States patents are specifically incorporated herein by reference.

With continued reference to FIG. 1, and with particular attention directed to the armature 22, persons of ordinary skill in the art will understand that glass reinforcing tape 34 is provided for purposes of reinforcing both the commutator and the armature conductors so that they will be better able to resist centrifugal forces during operation of the motor 10. It will further be observed that the commutator 26 is an open riser type of commutator, and includes commutator risers 36 to which the ends of the armature conductors are electrically connected, preferably by welding.

The motor 10, as described to this point, is a motor that has long been produced (well more than a year prior to the filing date of the present application) by the assignee of the present application. Field experience with motors of this type have shown, however, that some field problems are associated with commutator leakage currents and commutator failure at the in-board end of the commutator (hidden from view in FIG. 1).

Figure 2:
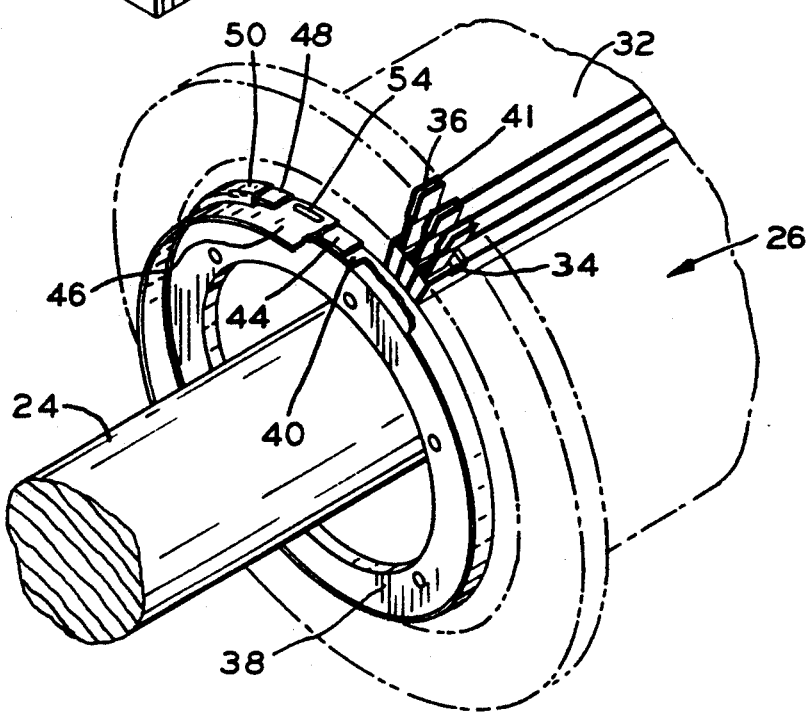
FIG. 2 is a view, with parts removed and parts broken away, of the commutator that forms part of the machine illustrated in FIG. 1, and that clearly reveals new and novel structural features.

FIG. 2 reveals, in more detail, (but with parts removed and parts broken away) the open riser, floating commutator 26 that is illustrated in FIG. 1. However, the relative orientation of shaft 24 and commutator 26 in FIG. 2 has been turned 180° with respect to the structure illustrated in FIG. 1. This has been done in order to show, with more clarity, the in-board end of the commutator 26. In other words, that portion of the commutator 26 that appears out-board of the risers (i.e., to the left of the risers 36 in FIG. 1) is called the out-board end of the commutator. However, in FIG. 2, the out-board end of the commutator appears on the right side of the illustrated figure. To promote understanding of the description now to be presented, FIGS. 2 and 3 should be jointly considered in conjunction with such description.

Prior art commutator structures used in motors of the same type as motor 10 are known to be comprised of a steel commutator shell 38 having a flange that is bolted to an armature coil support 47 (shown in FIG. 3, but with parts broken away). The coil support 47 (which carries armature core 49), in turn, is interference fitted to the shaft 24 (i.e., by shrink fitting), and thus is drivingly interconnected to the shaft 24. While a floating commutator has been shown herein, it should be understood that our invention may also be applied to commutators that are keyed, and/or shrink fitted or cold press fitted directly to the shaft.

In addition to the steel shell 38, prior commutators have included a layer of insulating mica 40, and electrically conductive commutator elements or conductors each made up of a commutator segment 42 and commutator risers 36. The risers 36 are formed of two thin copper strips butt welded or brazed to the surface of a copper commutator bar or segment 42, and brazed or welded to one another at a location where they are bent apart to form a cup or pocket 41 (see FIG. 2) for receiving an armature conductor that is welded thereto The armature conductors are disposed within the notch or pocket 41 in a riser, and both electrically connected to and mechanically fastened to such riser. Such connection and fastening is accomplished in the structure shown herein by welding, but other techniques (including mechanical ones) may be used for this purpose. As will be understood, adjacent commutator segments are separated in the body of the commutator by mica or other suitable insulating material. With prior art types of constructions, we have now determined that problems may arise due to leakage currents that leak from the commutator conductive elements (across the mica or glass or other sealant that may be applied thereover) and to ground, such as the shaft or the steel commutator shell. These problems may be associated with deposits, on the insulated surfaces of the commutator, of carbon and other contaminants which then provide a conductive path for leakage currents, and these problems are enhanced in "open-riser" commutator type machines. This is because contaminants can more easily migrate between the open risers (or other openings in the armature) to the in-board end of the commutator. Over time, such currents can result in the creation of conductive carbon leakage current paths formed by carbonization of materials along the in-board end of the commutator, all as will be understood by persons of ordinary skill in the art.

In accordance with preferred aspects of the present invention, we have provided an elongated leakage current path to inhibit leakage currents. In a preferred form, and as illustrated herein, we have done this by providing an electrically insulative skirt, i.e., a skirt of electrically insulating material that extends in cantilever fashion with respect both to the mica layer 40 and the commutator shell 38. The cantilevered skirt 46 defines or establishes a predetermined extended leakage current path between ends of the bars 42 and the skirt 38 or armature coil support 47, all as is clearly revealed in FIGS. 2 and 3.

In the particular embodiment illustrated in FIGS. 2 and 3, the preferred material that we have selected for use in making the insulating skirt 46 has very good dielectric characteristics. However, the mechanical and chemical characteristics of the selected material are such that it is difficult to retain the skirt in place about the commutator. For example, this material does not readily adhere or bond to other materials. We have solved this problem by providing a layer 44 of material that adheres and bonds to itself, and forms a tight band about the in-board end of the commutator; and a layer 48 of material that adheres to itself and traps the material from which skirt 46 is formed in a sandwich configuration and thus locks the skirt 46 in place. Finally, for purposes of sealing and further enhancing the insulative condition of the new and improved commutator structure shown in FIG. 3, we have provided an overlayer of an elastomeric fluorocarbon-type sealant coating 50 for the purpose of protecting against glass band damage that might be caused by commutator leakage current heating and subsequent burning.

At this point, it should be noted and understood that material such as the material 50 has heretofore been used to seal or coat the in-board end of commutators. However, this material has not provided any type of cantilevered skirt structure.

As will be understood from the description presented hereinbelow concerning the particular material selected for use in making the layers 44 and 48, and the skirt 46, we have found that difficulties may be encountered in reliably securing and holding our preferred skirt material to the commutator. In order to solve this problem, we have provided interlocking means which includes slots 54 formed in the cantilevered skirt material 46. Moreover, materials have been selected to be used for forming the layers 44 and 48 (and the thickness of the skirt 46 material has been selected to be sufficiently thin) so that an adhesive bond can be accomplished that involves the layers 44 and 48 adhering to one another through the slots 54 that are formed in the skirt 46. Thus, a series of preselectively circumferentially spaced mechanical interlocks are provided in structures embodying our invention, in a preferred form, so that the skirt 46 is reliably interlocked and secured to the in-board end of the commutator 26.

Figure 5:
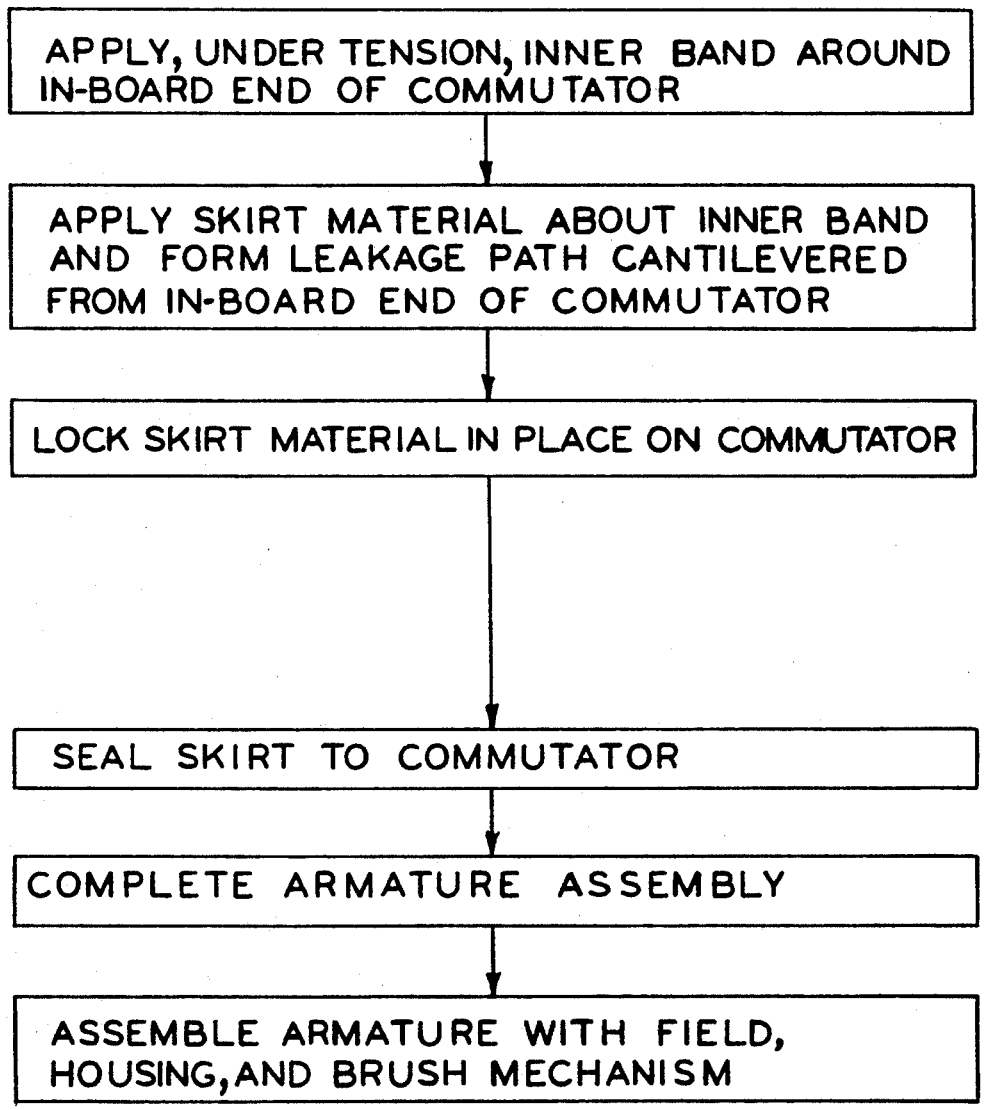
FIG. 5 is a diagram illustrating process steps that may be followed while practicing the present invention in various forms thereof.

FIG. 5 illustrates a series of steps that may be performed in carrying out the steps of our process invention, in preferred and alternate forms thereof. At the outset, when referring to FIG. 5 it will be noted that the commutator could be mounted to the armature shaft and thereafter the various steps performed to establish the structure revealed in FIG. 3. However, we believe that it is better to establish the cantilever skirt on the commutator, and lock the skirt to the commutator, followed by later mounting the commutator on the armature shaft (either directly, or indirectly by being mounted to the armature core or the armature coil support as was done in the embodiment illustrated herein).

Accordingly, and with reference to FIG. 5, we prefer to produce a commutator type machine by selecting a commutator to be used with the machine, placing the commutator on a fixture, and thereafter applying, under tension, an inner band 44 around the in-board end of the commutator, around the projecting portion of the shell that extends axially beyond the conductors 42. Thereafter, the process includes applying skirt material 46 about the inner band 44 and thereby forming a leakage path baffle in the form of a skirt that extends in cantilevered fashion from the in-board end of the commutator. Next, we lock the skirt material 46 in place on the commutator shell portion that (preferably by applying an additional banding material 48, under tension, over the skirt). After a sealant 50 is applied to the commutator (before or after curing the adhesives in layers 44 and 48), the commutator may be mounted to the armature core. Alternatively, the commutator may be mounted directly to the shaft by any of a number of different processes. For example, the commutator may be interference fitted on the shaft by press or shrink fits, or bonded to the shaft. As previously mentioned, the skirt is sealed to the commutator, preferably with a fluorocarbon-type sealant coating 50; the armature core and commutator are assembled to one another either on the shaft or, in the case of the illustrated embodiment, bolts that extend through the armature core are threaded into the tapped holes 53 in the steel commutator shell. The windings electrically connected with the commutator risers 36, and thereafter the armature (including shaft) is assembled with the field, housing, and brush mechanism of the desired dynamoelectric machine.

In an initial actual reduction to practice of the present invention, we produced an insulating system for the in-board end of a commutator by adding an insulation band, positioned as a skirt 46 over the commutator shell at the commutator in-board end. Such skirt extended the path for ground potential leakage currents. The material that we selected for the skirt or band was a 0.014 inch (0.356) thick Teflon (Teflon is a registered DuPont trademark) treated glass cloth available commercially from Allied Signal, Inc. as "Fluorglas".

The particular glass cloth selected is specified by Allied Signal as Standard PTFE/Glass #381-14. This particular material was selected based upon preferred properties that we desired for this application. More specifically, this material was selected because it has a thermal capability to 260° C. and thus is able to withstand the connection weld temperatures that occur when armature conductors are welded to the commutator risers. This glass cloth also has electrical properties such that it is able to withstand leakage currents without developing or depositing tracking materials; and it is essentially non-burnable and thus will not burn in the event of arcing or flashover within the motor. Moreover, this selected material is a glass based structure and thus it is not believed to be susceptible to cold-flow (which might occur with unsupported Teflon when subjected to banding and centrifugal forces that normally would be encountered during processing and motor operation).

We desired to secure the band to the commutator shell to withstand mechanical stresses such as those induced by centrifugal forces during processing and operation. However, the particular material selected is not characterized by being readily bondable. Therefore, we devised a means (described hereinabove) by which the band could be mechanically interlocked with, i.e., secured securely to the commutator shell. We used the sandwich and slot interlocking method described hereinabove and in connection with our initial reduction to practice, the inner layer 44 shown in FIG. 3 was formed by providing a layer of ⅜ inch (9.61 mm) wide polyester glass banding tape, under tension, about the commutator shell We applied two layers of this tape, and while applying it we maintained 150 pounds of tension on the tape (400 pounds per inch of tape width) to insure tight adhesion to the commutator and adhesion between layers of the tape itself.

The glass we used for layer 44 was a B stage polyester resin impregnated glass yarn with the yarns positioned parallel to one another to form a thin flat tape or band. We selected a tape that would be able to withstand temperatures of 155° C., was moisture resistant, and which had a low resin content. The material chosen is commonly known as armature banding tape and is commercially available from Liberty Polyglas, Inc. of West Mifflin, PA under the name "Polyglas Banding Tape (2)".

After applying the layer 44 of the above-mentioned Liberty Polyglas material, we then applied one layer of the above-mentioned Teflon-glass over the banding tape. When we did so, we positioned the edge 56 of the tapes (see FIGS. 4 and 3) against the end faces of the commutator bar 42 and then wrapped the Teflon tape around and over the banding tape. We overlapped the Teflon tape by two inches (5 cm), kept the tape flat, and endeavored to minimize wrinkles and waves in the tape. Thereafter, we applied four layers of the above-mentioned Liberty Polyglas ⅜ inch (9.5 mm) wide banding tape for a width W (see FIG. 3) of one inch (2.54 cm). In forming the layer 48 (see FIG. 3) we applied four layers of the above-mentioned tape by initially positioning the tape against the risers and taking care that the tape covered the slots 54 in the Teflon-glass 46. While applying the tape to form layer 48, we applied 150 pounds of tension (400 pounds per inch of tape width) and used care to avoid folds and wrinkles of both the glass tape and the Teflon-glass tape that was being covered. The glass banding tape is impregnated with a B-stage (semi-cured) polyester resin when purchased from Liberty Polyglas, Inc., and is sufficiently tacky or sticky to be "adherent", i.e., to adhere to itself during the wrapping steps described herein.

Subsequently, we curred the bands or layers 44 and 48 by placing the commutator in an oven at 175° C. for two hours. During the curing step, the resin in the 44 and 48 flows, and fills voids and air spaces in the bands and between the bands along the slots 54 (see FIG. 3). As the curing step proceeds, polymerization of the resin is completed and the chemical and mechanical nature of the bands becomes stabilized, with the cured resin being strongly bonded to itself, the glass yarn, and other surfaces of the commutator capable of being bonded to which are in contact with the resin during the curing step.

Structures manufactured by us were not cut apart to reveal the exact relationships between layers 44 and 48 as shown in FIG. 3. Thus, it should be understood that FIG. 3 illustrates relationships that we believe would be revealed if sections were cut from structures that were made by the processes described herein, using the materials described herein.

After oven curing, we assembled the commutator to the armature core by fastening the parts together with bolts as mentioned hereinabove. At this point, it is noted that the diameter of the shaft 24 in our initial reduction to practice was approximately seven inches in diameter. It also should be noted that other curing times and temperatures could be used.

We also applied two coats of an elastomeric fluorocarbon-type sealant coating 50 over the surface of the glass band layer 48, and the edges thereof (after layer 48 was fully cured). The particular sealant used may vary and is not believed to be critical with respect to the provision of a skirt as described herein. The sealant material used by us was made from a base polymer purchased from DuPont under the DuPont tradename "Viton B". The DuPont material was mixed with methyl ethyl ketone, methyl isobutyl ketone, and a suitable surfactant such as "Fluorad" (which is a material commercially available from Minnesota Mining Company). The curing agent to be used with the DuPont based polymer may be any suitable curing agent.

It will be understood that the sealant material may be made and applied as described in Penn et al. U.S. Pat. Nos. 4,422,234 (Dec. 27, 1983) and 4,341,972 (Jul. 27, 1982); both of which are assigned to the assignee of this application, and the complete disclosures of which are specifically incorporated herein by reference.

In a second reduction to practice, an armature was constructed as described above, except that the layer 44 of glass tape was formed by applying only a single layer of the glass banding tape over the in-board end of the commutator. As before, the tape was applied while maintaining 150 pounds (400 pounds per inch of tape width) of tension thereon. We believe that the glass banding that is applied to form the layers 44 and 48 may be cured as part of a complete armature by being cured in an oven held at a temperature of approximately 200° C. and baked for a period of three hours provided that the sealant used is one that can be applied to uncured glass bands (i.e., one that is chemically compatible with the uncured resins present in the uncured glass bands).

In order to test motors that were produced from the above described process, we spin balanced armatures formed in accordance with the invention at a speed of 1,000 RPM (a speed slightly greater than normal balance speed and the intended speed of operation of the motor). This permitted us to assess adherence of the resins on the Teflon-glass and adherence of the resin impregnated layers 44 and 48 to one another through the slots 54 in the Teflon. This test did not give any evidence of any change in the structural integrity of our insulative cantilever skirt system or any loss of adhesion.

It will be understood from the foregoing that we have now disclosed herein an improved insulation system, and methods of providing the same, which may be used to provide new and improved dynamoelectric machines and methods of making the same; wherein such systems incorporate electrically insulative cantilevered hoop structures of semi-rigid Teflon-glass which has been secured to a commutator in a novel manner. The cantilevered hoop substantially lengthens the path for ground potential leakage currents and, it is believed, will contribute to extended useful life of armature windings.

The particular dimensions and locations of the slots 54 in the Teflon-glass tape shown in FIG. 4 is not believed to be critical, it only being important that the size of the holes be such that the sandwiching layers of resin impregnated glass tape are able to adhere to one another through the slots (particularly note this phenomenon as illustrated in FIG. 3). In connection with the actual reductions to practice referred to hereinabove, we sized and located the slots 54 in tape 46 that had a width of about 2 inches (5 cm) so that the slots were ½ inch (12.7 mm) wide, 3 inches (7.62 cm) long from one end to another, and so that the spacing M and L respectively (see FIG. 4) was ⅝ of an inch (16 mm) and 6 inches (15.2 cm) respectively. Subsequently, we have also used a dimension L of 7.5 inches (19 cm), also with good results. As previously mentioned, the tape 46 had a thickness of about 0.014 inch (0.36 mm) thick, and the diameter of shaft 24 was approximately 7 inches (17.8 cm). The outer diameter of the 0.5 inch (12.7 mm) thick shell 38 was 16 inches (40.6 cm), and thus the diameter of the skirt 46 was in the neighborhood of about 17 inches (43.2 cm).

For the purpose of providing a complete and full disclosure, dimensions W, S, IB, and OB are shown in FIG. 3. In actual reductions to practice of our invention, the length or width W of skirt 46 was 2 inches (5 cm); the in-board length of extension S of mica layer 40 was about 1¼ inches (3.2 cm); the width or length IB of the inner layer 44 of glass tape was about 1⅛ to 1¼ inches (2.8-3.2 cm); and the width or length of the outer layer 48 of glass tape was about 1 inch (2.5 cm). It thus will be understood that, in this particular embodiment, the skirt projected axially beyond the mica 44 by a preselected axial distance of about ¾ of an inch (19 m). Thus, the path for leakage current from the end faces of conductors 42 to shell 38 was increased (as compared to the leakage path for the mica alone) by the predetermined or preselected amount of about 1½ inches (due to the path being increased by both the upper and lower faces of skirt 46 as viewed in FIG. 3).

We determined that the locked insulating system (after curing) was able to withstand operation mechanical stresses by evaluating whether manually pulling (in the axial direction of the shaft) on the skirt 46 would be able to remove the skirt from the commutator. We found that the band or skirt could not be removed by hand when applying such a force and, we believe that this is adequate demonstration of a firm and acceptable interlock holding the skirt to the commutator.

While we have now shown and described hereinabove preferred and alternative embodiments of products including specific structural, chemical, and dimensional details thereof; and processes of making such products; the disclosure contained herein should be construed as being exemplary, and the invention itself should be understood as being limited only by the scope of the claims that are appended hereto and that form part of our disclosure.

What we claim as new and desire to secure by Letters Patent of the U.S. is:

1. A method of establishing a predetermined desired leakage current path for a dynamoelectric machine commutator, said method comprising the steps of: wrapping an inner band of adherent material about a projecting shell portion of a commutator; wrapping electrically insulative skirt material, having spaced apart openings therein, about the inner band of adherent material with a plurality of such openings positioned over the inner band of adherent material, and arranging the skirt material to project in cantilever fashion as a hoop that projects beyond the projecting shell portion; wrapping an outer band of adherent material about and over the skirt material and establishing adherent inducing proximity, between the inner and outer bands of adherent material, through a plurality of the openings in the skirt material; treating the commutator so as to cause the inner and outer bands of adherent material to bond to one another through said openings and so as to cause the chemical nature of the adherent material to become stabilized.

2. The method of claim 1 wherein the adherent material is resin impregnated glass cloth and wherein the step of treating comprises the step of heating the resin impregnated glass cloth for a period of time to cause curing of the resin in the glass cloth.

3. The method of claim 2, wherein the method further comprises the step of applying a sealant over the outer band of adherent material 4. The method of claim 1 wherein the method further comprises wrapping the adherent material while applying a tensile force thereto of about 400 pounds per inch width of adherent material.

5. A method of establishing a predetermined desired leakage current path for a dynamoelectric machine commutator, said method comprising the steps of: wrapping an inner band of material about a projecting shell portion of a commutator; wrapping electrically insulative leakage path defining material, having openings therein, about the inner band of material with a plurality of such openings positioned over the inner band of material, and arranging the leakage path defining material to project in cantilever fashion as a hoop that projects beyond the projecting shell portion; wrapping an outer band of material about and over the leakage path defining material and establishing an interlocking relationship, between the inner and outer bands of material, through openings in the leakage path defining material; treating the commutator so as to cause the inner and outer bands of material to become stabilized chemically and mechanically.

6. The method of claim 5 wherein the inner and outer bands of material are comprised of resin impregnated glass cloth, and wherein the step of treating comprises the step of heating the resin impregnated cloth for a period of time to cause curing of the resin in the glass cloth.

7. The method of claim 6, wherein the method further comprises the step of applying a sealant over the outer band of material after it has been cured by the heating step.

8. The method of claim 7 wherein the method further comprises wrapping the banding material while applying a tensile force thereto of about 400 pounds per inch width of adherent material.

9. The method of claim 5 wherein the leakage path defining material is a tetrafluoro ethylene treated glass cloth, and the step of wrapping such cloth results in forming a skirt about the projecting shell.

10. The method of claim 9 wherein the inner and outer bands of material are resin impregnated glass cloth, and the treating step causes the inner and outer bands to bond to one another through the openings in the tetrafluoro ethylene treated glass cloth.

* * * * *